Feb. 19, 1946.  R. V. KLEINSCHMIDT  2,395,004
METHOD OF AND APPARATUS FOR EVAPORATING LIQUIDS AND CONDENSING VAPORS
Filed Nov. 9, 1939  2 Sheets-Sheet 1
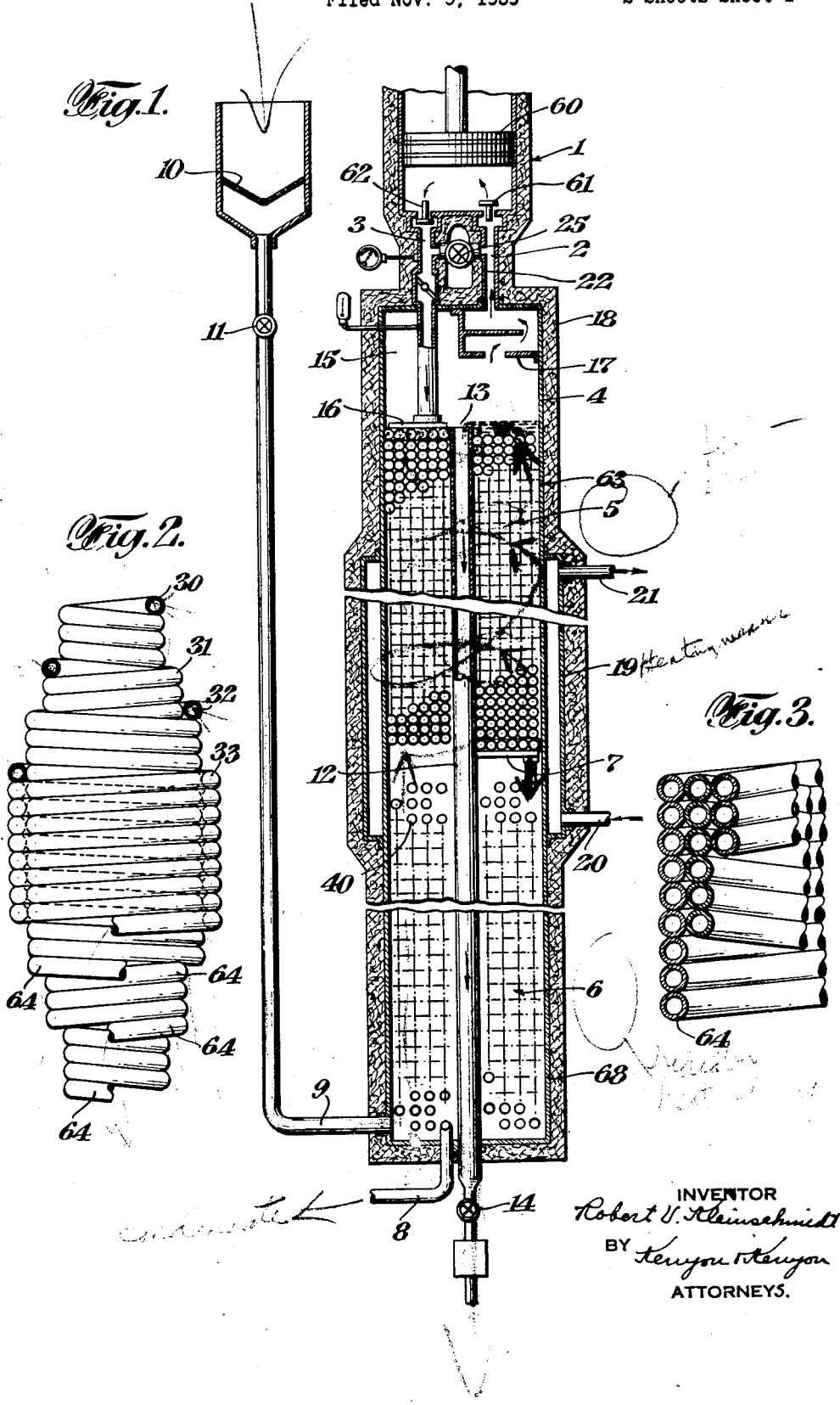
INVENTOR
Robert V. Kleinschmidt
BY Kenyon & Kenyon
ATTORNEYS.

Feb. 19, 1946.   R. V. KLEINSCHMIDT   2,395,004
METHOD OF AND APPARATUS FOR EVAPORATING LIQUIDS AND CONDENSING VAPORS
Filed Nov. 9, 1939   2 Sheets-Sheet 2
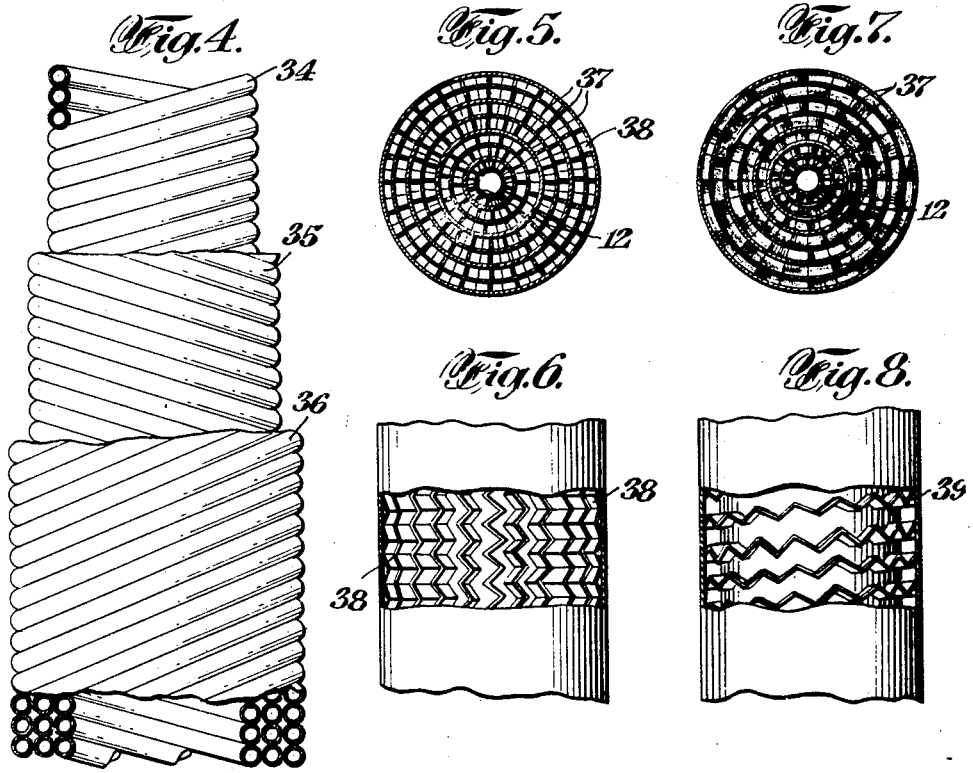
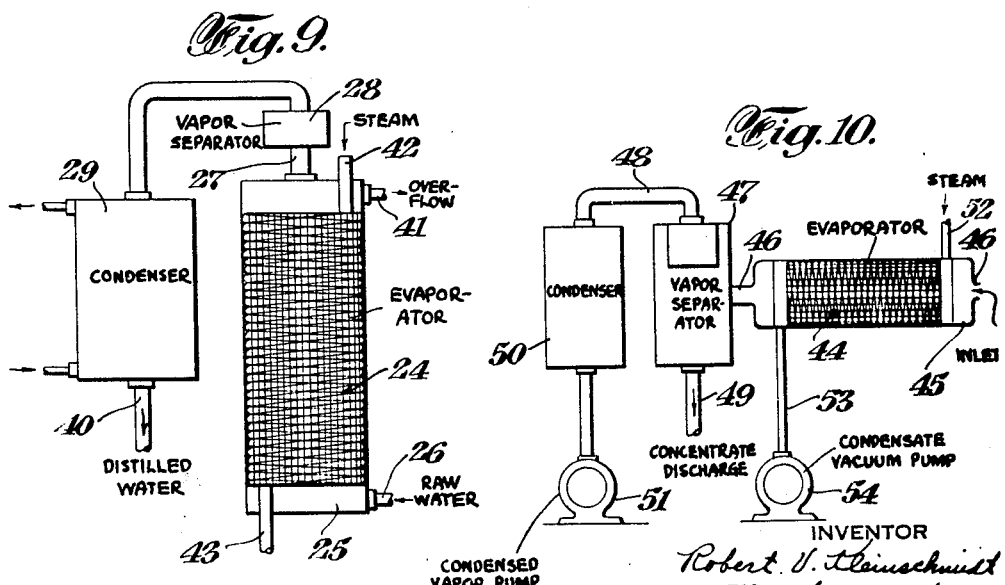

Patented Feb. 19, 1946

2,395,004

UNITED STATES PATENT OFFICE 2,395,004

METHOD OF AND APPARATUS FOR EVAPORATING LIQUIDS AND CONDENSING VAPORS

Robert V. Kleinschmidt, Stoneham, Mass., assignor to Arthur D. Little, Inc., a corporation of Massachusetts Application November 9, 1939, Serial No. 303,678

11 Claims. (Cl. 202—75)

This invention relates to improvements in method of and apparatus for evaporating liquids and condensing vapors. One application of this invention relates to separating components of a fluid mixture of two or more substances by reason of their difference in boiling point or volatility. The process and apparatus of this invention is especially applicable to those cases where both the initial mixture and the separated components are liquids during some portion of the process, but these liquids may be more or less concentrated solutions of solids, liquids or gases in liquids, or liquid mixtures of materials normally in the solid or gaseous form in pure state. The process and apparatus of this invention relate generally to what is commonly referred to as distillation, fractionation, rectification, evaporation, condensation, concentration and the like which are characterized by the evaporation of a portion of a liquid mixture or the condensation of a vapor or both. Any such liquid mixture is referred to herein as a "solution" and when any portion thereof is vaporized any such operation is referred to herein as "distillation" for the purposes of brevity.

One object of this invention is to provide a process and apparatus which affords highly efficient utilization of the surface area available for heat exchange between evaporating and condensing fluids on the two sides of a heat exchange system.

Another purpose of this invention is to afford distillation method and apparatus which inhibits the deposition of solids on the heat exchange surface during evaporation of a solution.

A further purpose of this invention is to afford a heat exchanger which is extremely compact and which is adapted to afford high heat transfer capacity for relatively small external dimensions. In this connection, the reduction in external dimensions also reduces the heat losses of the exchanger to the outside atmosphere.

It is a feature of this invention that a method and apparatus are used wherein a fluid to undergo change of phase from liquid to vapor or vice versa is moved in a passage in out-of-contact heat exchange with another fluid, the passage having such internal dimensional characteristics (an elongated passage of relatively small cross-section) as to maintain the liquid phase intimately commingled with its vapor phase throughout a substantial distance of flow of the fluid through the passage thereby increasing the rate of flow of the liquid phase in the portion of the passage where it is commingled with its vapor and increasing the efficiency of heat exchange between the fluid and the wall of the passage.

It is a further feature of this invention that the temperature differential between a fluid being evaporated and a fluid undergoing condensation may be controlled in all parts of the heat exchanger and so as to be appropriate to the treatment of heat sensitive liquids, for example, as will be described more in detail hereinbelow while maintaining high efficiency of heat transfer.

Referring to further features relating to preferred practice of this invention, a liquid undergoing evaporation or condensation is moved in a single pass through an elongated passage having relatively small cross-sectional flow capacity in order to maintain the liquid which is undergoing evaporation or condensation intimately commingled with its vapor. Moreover, a liquid undergoing evaporation is discharged from the elongated passage or passages prior to complete evaporation, the vaporized portion of the original liquid being withdrawn as such and the concentrated liquid being withdrawn from the system. The concentrated liquid is preferably withdrawn in heat exchange relation with the liquid flowing into the heat exchanger so as to assist in maintenance of the proper heat balance between liquids flowing into the heat exchanger and liquids flowing out of the heat exchanger.

Further purposes, features and advantages of this invention will be apparent in connection with the following description of certain illustrative embodiments of this invention in connection with the accompanying drawings, wherein Figure 1 is a side sectional view, partly diagrammatic, of one form of apparatus embodying this invention, which apparatus is suitable for separation of a volatile from non-volatile components by simple distillation;

Figure 2 is a side view partly in section of a portion of one form of heat exchange coils which may be used in connection with the apparatus shown in Fig. 1, for example;

Figure 3 is a detail side view of a portion of the coils shown in Fig. 2;

Figure 4 is a view similar to that of Fig. 2 of an alternate form of heat exchange coil;

Figure 5 is a sectional plan view of an alternate form of heat exchange unit which may be employed according to this invention;

Figure 6 is a side view of the heat exchanger shown in Fig. 5 with a portion of the wall removed to indicate the construction of the exchanger;

Figure 7 is a sectional plan view of a still further modification of a heat exchange unit which may be used according to this invention;

Figure 8 is a side view of the heat exchanger shown in Fig. 7 with a portion of the wall removed to indicate the construction of the exchanger;

Figure 9 is a side view showing diagrammatically the utilization of a heat exchanger embodying this invention, which is adapted for use in the distillation of an aqueous solution using an external source of steam; and Figure 10 is a side view showing diagrammatically an alternate form of apparatus utilizing a heat exchanger according to this invention, which apparatus is adapted for use in the distillation of heat-sensitive liquids, for example.

In my co-pending application Serial No. 114,889, filed December 9, 1936, for Distillation method and apparatus, on which Patent No. 2,185,595 issued January 2, 1940, I have shown how compression of vapor can be used to produce a balanced heat cycle for distillation processes, mechanical compression being utilized as the source of energy used in distillation and the apparatus being isolated so far as practical from all external sources of heat and cold. The invention which is the subject-matter of the present application may be utilized to advantage in conjunction with the invention covered by my aforesaid application Serial No. 114,889 (Patent No. 2,185,595). In Fig. 1 of the present application, an apparatus is shown which is similar to apparatus shown in my application Serial No. 114,889 and in which a heat exchanger comprising certain features and characteristics of the present invention is incorporated.

In Figure 1, there is shown a compressor which is indicated generally by the reference character 1. The compressor is shown as comprising a reciprocating piston 60 adapted to draw vapor from the interior of the vaporization chamber 4 through pipe 2 controlled by one-way valve 61 and discharge it at higher pressure through pipe 3 controlled by one-way valve 62. Any other type of compressor may be used. A by-pass, e. g. the by-pass 22 controlled by valve 23, may be employed to afford greater control of the apparatus. The vaporization chamber 4 may comprise the upper part of a cylindrical liquid and vapor-tight shell or tube indicated generally by the reference character 63 which is closed at each end except for an opening at the top communicating with pipe 2 and an opening near or at the bottom communicating with pipe 9. The pipe 3 carrying the discharge from the compressor 1 passes through the wall of the chamber 4 near or at the top thereof and communicates with the upper end of the exchanger in chamber 4 which is indicated generally by the reference character 5 and which will be described more in detail below.

A second exchanger indicated generally by the reference character 6 is also included within the shell 63. The portion of the shell 63 occupied by exchanger 6 may be designated as the preheating chamber 68. The character of the exchanger 6 will be described more in detail below. The lower end of the exchanger 6 communicates with the outlet pipe 8, which pipe is adapted to withdraw condensate from the apparatus.

The pipe 9, which may contain a filter 10 for removing solid materials such as dirt and scale and a valve 11, communicates with the interior of the vessel 63 at its lower end near the point where pipe 8 emerges.

A tube 12 with one end 13 opening into chamber 4 at or near the top end of exchanger 5 proceeds downward through the center of exchangers 5 and 6 through the wall or shell 63 to act as an overflow discharging through valve 14 any liquid reaching point 13. When the apparatus is operated at atmospheric pressure valve 14 may preferably be omitted.

The entire shell 63, except at its lower end, the compressor 1, and the connecting pipes 2 and 3 are insulated against heat losses by the covering 18. Any suitable heat insulating material such as magnesia, corrugated asbestos paper, mineral wool or the like may be used.

Features of the present invention relate to the construction and operation of the heat exchanger 5. The exchanger 5 is composed of concentric layers of tubing 64, the successive layers being wound in opposite directions as indicated in Figures 2 and 3. Tubing 64 is arranged in layers or coils 30, 31, 32 and 33 as indicated in Figures 2 and 3 which show part of the layers or coils of the exchanger 5. The coils of the exchanger 5 substantially fill the cross section of chamber 4 so that the incoming liquid being evaporated is forced to flow through passages between the coils in the manner described below. The layers 30, 31, 32 and 33 are attached to and communicate with a header 16 with which the pipe 3 communicates. At the other end, the layers 30, 31, 32 and 33 communicate with the header 7. Thus it is apparent that the tubing 64 affords a plurality of elongated passages arranged in parallel between headers 16 and 7. The coils are wound so that the tubing in each coil just touches the tubing in the adjacent coil, and with this construction the outside wall of the tubing 64 in the different layers forms elongated passages adapted to contain liquid maintained in heat exchange with liquid within the tubing 64. When the coils are so wound, the cross-sectional area of flow of the passages outside of the tubes has a ratio of about one to two to the cross-sectional flow area of the passages afforded by the inside of the tubing. For example, for quarter-inch outside diameter twenty gauge copper tubing, the areas of the passages outside and inside the tubing are respectively .01341 and .03017. However, since it is seldom possible to wind the coils without some slight clearance between the turns of the different layers, the cross-sectional area of flow of the passages outside the tubing taken as a whole will be somewhat greater in proportion to the cross-sectional flow of the passages on the inside of the tubing, the ratio being more nearly one to one. The passages inside the tubing are of course circuitous, inasmuch as the passages follow the shape of the tubing. The passages on the outside of the tubing, where the turns of the tubing are wound in different directions, are of a zigzag character as shown, which tends to impart turbulence to liquid passing therethrough. Accordingly, a construction wherein the turns of the tubing of the different layers are wound in alternate directions is preferable. When the turns of tubing in the different layers are wound in the same direction, passages formed by the outside walls of the tubing can be afforded, but such passages conform more nearly to the path of the passages formed by the inside of the tubing.

In the practice of the principal features of this invention very long passages of small internal cross-section are used. In this manner, mixtures of liquid with its vapor can be maintained in intimately commingled relation so that the liquid will move in the passages at approximately the same rate that the vapor moves at any given point in the passage. For example, when water or dilute aqueous solutions are used, it is desirable to use passages smaller than about one-quarter inch internal diameter. In the case of passages of other than circular cross-section, the equivalent diameter may be computed as four times the area divided by the perimeter of the cross-section, which is twice the "hydraulic radius." For liquids of greater viscosity and lower surface tension than water, somewhat larger tubes are permissible; but, if smooth cylindrical tubes are used, diameters not greater than one-half inch will ordinarily be most satisfactory. As aforesaid the tubes should be of considerable length in proportion to the cross-sectional area of flow. For example, I have found that one-quarter inch outside diameter tubes of twenty gauge thickness preferably have a length of from about twenty to fifty feet in the practice of this invention. In general, it is preferable to maintain the length-internal diameter ratio of the tubing (or other passage means) which is used in the order of 1,000 or 5,000, the ratio of length to hydraulic radius being about double the foregoing. While lower length-internal diameter ratios may be used such as length-internal diameter ratios greater than about 600 to 1 (ratio of length to hydraulic radius 1200 to 1), improved results are obtained by increasing the length-hydraulic radius ratio to 1500 to 1 and preferred results are obtained when the ratio is further increased so as to be in the order which has been mentioned above. The average hydraulic radius of the conduits should be at most about ⅜ inch to about ¾ inch proportionally for liquids having a surface tension of about 70 to about 20 dynes per centimeter. In other words for liquids having a relatively high surface tension, e. g. water, with a surface tension of 70 dynes per centimeter, the maximum average hydraulic radius of the conduits should be less than about ⅜ inch whereas for a liquid such as gas oil having a relatively low surface tension of 20 dynes per centimeter, the maximum hydraulic radius preferably is about ¾ inch. Preferred results are attained when the hydraulic radius is at most about ¼ inch to ½ inch for liquids having proportionally a surface tension of about 70 dynes per centimeter to 20 dynes per centimeter.

I have found that even in the case of smooth passages, by making them of sufficiently small cross-section the liquid bridges across them by surface tension, entrapping bubbles of vapor, and that there is formed in effect, a froth of liquid with bubbles of the vapor of some constituents of the liquid. This type of action is particularly efficient in carrying out the process of my invention, because in this case the liquid is at once kept in contact with the heating or cooling surfaces and is propelled positively along the tubes thus having a high velocity in moving over the heating surfaces.

In contradistinction to the process of my invention, the usual type of evaporation process consists in causing the liquid to flow in a thin film against the surfaces of the heating tubes, while the vapors pass off from the center of the tubes, without substantial tendency to move liquid and often even flowing in the opposite direction to the liquid flow.

My process is particularly advantageous when the entire evaporation of any portion of the liquid can take place during a single pass through the exchanger, and my process is therefore well adapted to counter-current heat transfer. In preferred practice of my invention at least about 50% of the liquid being evaporated is converted into vapor during a single pass through an elongated conduit and while intermediate the ends thereof. In the usual case the tubes or other passages are of substantially constant cross internal area or of substantially constant hydraulic radius although this is not essential. If the hydraulic radius of the conduit in which a liquid is being evaporated becomes increasingly large, the operation should be carried out so that the increase in volume of the liquid plus vapor mixture becomes greater at a substantially more rapid rate. Conversely in condensing a vapor the decrease in volume of mixed vapor and condensate should take place more rapidly than the hydraulic radius becomes decreased.

In using passages of the character above described, it is preferred to incorporate the tubes in a heat exchanger using a coiled construction as illustrated in Figs. 1, 2 and 3 in order to make the structure more rigid and in order to reduce the external area of the apparatus and thereby reduce the heat losses on the outside of the apparatus. The construction shown in Figs. 1, 2 and 3 is suitable for relatively clean liquids which do not tend to foul the surfaces of the tubes. For liquids which tend to foul the tubes making periodic cleaning necessary, the modification shown in Fig. 4 is regarded as preferable. In this embodiment of this invention, the coils or layers 34, 35 and 36 (additional layers, of course, may also be employed) are wound independently on accurately-sized mandrels and are rolled or turned on the outside of the coils to accurate dimensions. The successive turns of each layer are then brazed, soldered or welded or otherwise fastened together sufficiently to allow each layer of coiled tubing to be removed from the mandrel on which it is wound and handled as a single rigid shell. A solder consisting of 90 parts of silver to 10 of copper can be conveniently used for this purpose. When the turns of the coils are soldered or otherwise joined to adjacent turns substantially continuously, the coil as a whole affords a substantially imperforate shell or barrier. The shells or coils thus formed can then be slipped or nested one inside the other and can be readily removed from the heat exchanger for cleaning.

While mention has been made of the use of tubing it is apparent that the cross-sectional shape need not necessarily be circular and that flattened tubing or pipes may be used as well as conduits of other shape. Moreover while the pipe is shown as wound in a cylindrical coil, the word coil is used in a broad sense as referring to tubing, pipe or the like arranged in turns to afford a compact unit of conduit having much greater continuous length of flow passages than over-all length and that coils may be of different shape.

The construction shown in Figs. 1, 2, 3 and 4 is such that, if each layer of coiled tubing is made of a single tube, the length of the coiled shells decreases as the diameter of the coiled shells increases for a given length of tubing. Since it is usually desirable to use in parallel a large number of relatively small tubes, according to this invention, for carrying the required flow of liquid, it is preferable to wind several tubes or other pipes side by side in each layer and to increase the number of tubes arranged in parallel, as the diameter of the successive layers or shells of tubing is increased. For example, it has been found desirable to vary the number of tubes arranged in parallel in each layer in proportion to the mean diameter of the layers. Thus with one-quarter inch outside diameter tubes, the first layer may consist of four tubes wound side by side on a one and three-quarter inch core, giving a mean coil diameter of two inches. The next layer will then have five tubes and a mean diameter of two and one-half inches. The next succeeding layer will have six tubes and a mean diameter of three inches, etc.

An alternate embodiment of this invention is shown in Figs. 5 and 6. Spaced sheet-like shells 37 are used. For use in connection with the apparatus shown in Fig. 1, the cylindrical shells may be arranged around the outlet line 12, for example. Between the shells 37 are zigzag fins 38 or other dividing means which are soldered or welded or united to the shells or some of them in any desired way appropriate to produce a plurality of elongated passages, preferably tortuous, passages, between the different shells 37. Appropriate connections (not shown) may be used for connecting alternate passages to the headers 16 and 7, for example (in the apparatus shown in Fig. 1), so as to permit liquid to be evaporated to be moved through one group of alternate passages and so as to permit condensing vapor to be moved through the other group of alternate passages, so that the evaporating and condensing liquids may be maintained on opposite sides of the heat exchanger.

A still further embodiment is shown in Figs. 7 and 8. In these figures, the shells 37 are again employed. However, instead of having zigzag fins which are generally disposed longitudinally of the shells 37, zigzag fins are employed which follow a circuitous path. By the construction shown in Figs. 7 and 8, the length of the passages between the shells 37 formed by the fins 39 can be made greater than the length of the passages between the shells formed by the fins 38 for the same over-all length of the shells 37. By varying the inclination of the fins 39 shown in Figs. 7 and 8, variation of the number of passages arranged in parallel may be had as desired.

In the apparatus shown in Figs. 1 to 8, it is preferable to have the cross-sectional areas of flow in the passages on the two sides of the exchanger approximately equal. However, desirable results are obtained even though there is considerable variation between the cross-sectional areas of flow of the passages up to about a three-to-one ratio. In this connection, either the liquid to be heated or the condensing vapor may be confined in the side of the heat exchanger having the smaller flow capacity but for reasons of efficiency in the use of energy, it will generally be desirable to have the passages in which vapor is being formed, have the lesser cross-section, since high velocities may be generated in these passages with very little expenditure of energy as will be more fully described below. When the ratio exceeds about three to one in either direction, the efficiency of the apparatus begins to fall off so that the advantages of this invention are not realized to as great an extent as when the cross-sectional flow capacities on each side of the heat exchanger are maintained within the limits above mentioned.

In the apparatus shown in Fig. 1, the heat exchanger 5 may not only be in the form shown in Figs. 2, 3 and 4, but may also be in the form shown in Figs. 5, 6, 7 and 8. In any such construction, the lower end of the heat exchanger 5 may communicate with the second heat exchanger 6 which is in the form of coiled tubing 40 attached at one end to the header 7 and attached at the other end to outlet line 8.

To facilitate an understanding of this invention, it will be illustrated in connection with a specific example such as the separation of fresh potable water from sea water as follows: The raw sea water is supplied through the filter 10 and pipe 9, the rate of flow being controlled by valve 11. The sea water enters preheating chamber 68, passes continuously upward in shell 63 and into the chamber 4, at the same time passing through the elongated passages afforded by the construction above described of the heat exchanger 5. The liquid is, of course, in intimate contact with the outside surfaces of the tubing contained in each of these exchangers.

As the sea water passes upward in chamber 68, it is heated nearly to its boiling point by two streams of fluid passing downward in out-of-contact and countercurrent heat exchange through heat exchanger 6 and through tube 12 respectively. The origin of these two streams will presently be described. In passing over exchanger 5, the sea water is further heated by vapors condensing therein whose origin will presently appear, and the sea water is thus made to generate vapor in the elongated passages of the exchanger 5. The vapor which is generated in these passages does not bubble out of the passages leaving the liquid behind, but, due to the small cross-sectional area and the tortuous character of the passages, the vapor becomes commingled with the liquid. Since the vapor occupies a much greater volume than the liquid and since the liquid is being continuously moved into the system at a predetermined rate, the mixture of vapor and liquid moves in the elongated passages at a greater rate than the liquid which is in the part of the passages that does not contain vapor. As the amount of vapor generated in the elongated passages increases, the rate of movement of the liquid together with the vapor is accelerated and the velocity of the liquid over the surface is increased even though the cross-sectional flow capacity of the passages does not decrease. Preferably the movement of the liquid is accelerated at approximately the same rate that the movement of the vapor becomes accelerated. In this manner, the rate of heat transferred between the liquid being evaporated and the walls of the tubing in the exchanger is greatly increased and the efficiency of the system as a whole is greatly increased. Increases of velocity as compared with the velocity of the liquid unmixed with vapor have been attained in the neighborhood of approximately one thousand-fold. However, even increases in velocity of tenfold result in a pronounced increase in the efficiency of the apparatus.

Increases in velocity of the character aforesaid are accomplished according to this invention with very small energy expenditure. Heat energy from a condensing liquid is transferred to an evaporating liquid and part of it is transformed to kinetic energy of liquid moving rapidly in the conduit so as to augment the efficiency of the heat transfer under a novel principle of operation. The kinetic energy is preferably converted back to heat while the liquid is in the system but after the heat exchange step has been completed. In this connection, this invention is to be contrasted with mechanical means for circulating a liquid. In the practice of this invention, liquid can be moved as commingled with vapor at a velocity which, if attained merely by mechanical impelling of a liquid, would require about a thousand times as much power. This illustrates the extremely high utilization of energy which is possible in connection with the practice of this invention in comparison with prior methods and apparatus. Likewise, it is apparent that this great increase in efficiency is attained with the utilization of simple and inexpensive apparatus. It is apparent also that the advantages of this invention are afforded in conjunction with highly compact equipment (a matter of great value on ships, for example). The compactness of the equipment also minimizes heat losses from the system and serves to further decrease energy input required for accomplishing distillation of a liquid.

The increase in velocity is also important in that the liquid when maintained in rapid motion does not tend to deposit solids on the walls of the surface used in the heat exchange equipment to the extent that such deposition occurs in connection with liquids moved more gradually. The motion of the liquid which is achieved in the practice of this invention serves to carry any solids thrown out of solution with the residual liquid so that such solids are withdrawn from the system with the discharged concentrated liquid.

Upon reaching the level of the end 13 of the tube 12, the vapor is liberated into the space 15 in chamber 4 and the liquid is discharged from the ends of the elongated passages and overflows the end 13 of the tube 12, so that the liquid—e. g., concentrated brine from sea water—is discharged from the system through the outlet line 12. While the outlet may lead directly from the system adjacent the level of the liquid in chamber 4, it is preferable to withdraw the concentrated liquid down through the chambers 4 and 68 in out-of-contact heat exchange with the liquid in these chambers. The removed concentrated liquid thereby forms one of the two streams which have been referred to above and which serves to preheat the incoming liquid.

Vapor released into space 15 is separated from fog and entrained liquid by suitable baffles 17 and then is withdrawn through pipe 2 into compressor 1. From compressor 1, it is discharged at a pressure corresponding to a condensing temperature higher than the boiling point of the concentrated sea water at the surface of the solution in chamber 4 into pipe 3 from which it enters the tubes or other passages forming exchanger 5. This compressed vapor furnishes heat for boiling the water surrounding the tubes of exchanger 5 in the manner referred to above.

The utilization of elongated tortuous passages in which to condense the vapor is also important. The vapor is condensed at a point in the passages intermediate the ends of the passages. As the volume of liquid resulting from the condensing vapors increases, this liquid becomes commingled with the condensing vapor due to the limited cross-sectional capacity of the tubing, or due to the tortuous character of the passages, or both. In this manner, the liquid which has condensed is moved rapidly with the condensing vapor and decelerates as the volume of the uncondensed vapor decreases. The liquid and vapor preferably move at approximately the same rate at any given point. Eventually, substantially all of the vapor condenses to a liquid. Since the liquid is of much less volume than the vapor, the liquid after the vapor has been substantially completely condensed moves much more slowly in the passages than the vapor and much more slowly than the mixture of liquid in the vapor. However, during the interval when the vapor is condensing in the passages and the vapor-liquid mixture is decelerating, the condensing liquid is maintained in such a state of movement as to maintain a high rate of heat transfer between the condensing mixture and the walls of the passages in which it is confined. In this way, the system is enabled to operate at a very high efficiency. This invention is particularly useful in heat exchange systems wherein the heat transfer between the evaporating and condensing liquids is a substantial factor in the over-all heat transfer.

In steady operation of the apparatus shown in Fig. 1, the vapors which are condensing in the tubing of exchanger 5 are substantially all condensed when they reach the end of this exchanger and enter the second exchanger 6. If the heat losses from the surface of the apparatus to the surrounding air are less than the heat of compression supplied by the compressor, the condensation of the vapors in exchanger 5 will evaporate an equivalent amount of liquid and supply this vapor to the compressor so that the process is self-sustaining. The condensate from exchanger 5 in passing through exchanger 6 forming the second stream previously referred to preheats the sea water entering the chamber 68 so that it will be more readily vaporized when the sea water reaches the exchanger 5.

The thermal heat balance can be illustrated by the following example. Sea water containing three per cent. salt (specific heat 0.98) enters through pipe 9 at 45° F. at the rate of 30 pounds per hour. In passing through preheater chamber 68, it is heated to 208° F., thereby receiving 4800 B. t. u. per hour. In passing through vaporization chamber 4, it is heated to its boiling point, 213.4° F., and five-sixths of it is converted to vapor or 25 pounds per hour. The boiling point at the surface of the liquid in chamber 4 has then risen to 220° F. The overflow into tube 12 at end 13 of the tube is at the rate of 5 pounds per hour, the concentration being 18% salt. The heat absorbed by the sea water from vaporization chamber 5 is 24,500 B. t. u. The vapor supplied to the compressor is 663 cubic feet per hour, and this is compressed to 4 pounds gauge in a compressor which uses 800 watts of electric power input to the motor. The vapor leaves the compressor at 280° F. with a volume of 570 cubic feet. It starts condensation in coil 5 at 225° F. and ends condensation at a pressure of 3.0 pounds at a temperature of 222° F.

The condensate is cooled in preheater exchanger 6 to 50° F. and the overflow in tube 12 is cooled to 110° F. at the discharge. The heat lost from the system in condensate is (5×25)=125 B. t. u./hr. and in overflow is (65×5×.90)=295 B. t. u./hr. or 420 B. t. u./hr. in both together. There is an input of 2730 B. t. u./hr. to the motor (800×3.412) of which 80% is imparted to the compressed vapor or 2180 B. t. u. The insulation is such that not more than 2180−420=1760 B. t. u. per hour of heat is lost by radiation and conduction. It will be noticed that a total of 29,300 B. t. u. of heat are transferred and utilized with an expenditure of only 2730 B. t. u. of electrical energy.

I have found that suitable dimensions for a still delivering 3 gallons of distilled water per hour from sea water with a power consumption of 800 watts are as follows. The exchanger 5 is made with fifteen quarter-inch outside diameter 20 gauge soft copper tubes, each 25 feet long, wound in three layers upon a 1⅞" outside diameter thin-walled brass tube 12. The layers contain 4, 5, and 6 tubes respectively. The exchanger 6 consists of a single tube 100 feet long of tubing of the same size wound in spiral pancake coils.

The compressor displaces twelve cubic feet per minute and raises the pressure about four pounds per square inch.

In order to furnish the initial heat supply when starting from cold, a heated fluid may be passed through the jacket 19, having inlet and outlet pipes 20 and 21. Alternatively, an electric heating coil could be used in place of the jacket 19. Such means are desirable in order to speed up the starting operation. In any case, the heating is cut off as soon as normal operation of the device starts.

In the foregoing operation, it is to be noted that the maximum temperature differential is only a few degrees. The present invention is especially useful in conjunction with heat exchange systems wherein the maximum temperature differential is relatively small and is maintained nearly constant. In such systems, the efficiency of heat transfer is of especial importance. According to this invention, a rate of heat transfer can be maintained which is two or three times that which is possible for similar surface areas in systems which have been used prior to this invention. While this invention is especially useful in conjunction with heat exchange systems wherein the maximum temperature differential is quite small, this invention is applicable as well where higher temperature differentials are used, such, for example, as 100° F. By way of illustration, a heat exchanger embodying this invention may be used in conjunction with the distillation of calcium chloride brine solutions which are used in dehumidification apparatus. For such purpose, it is desirable to recover relatively concentrated solutions of calcium chloride, and a temperature differential in the neighborhood of 50° F. may be employed. The practice of this invention is especially advantageous when the temperature differential is less than about 50° F. Even when the temperature differential is very low and in the neighborhood of 10° F. the liquid and vapor can be intimately commingled notwithstanding the employment of smooth walled conduits provided the conduits are of the small hydraulic radius in proportion to length described above. In many types of distillation I prefer to have the temperature differential between the fluid and the walls of the conduit in which the fluid is confined not greater than the difference between the boiling point of the liquid being distilled and the condensing temperature of the pure vapor that is removed from the liquid being distilled.

It may be noted also in connection with the foregoing description of this invention that the condensing liquid and overflow are both caused to be in out-of-contact heat exchange relation with the liquid being evaporated. In this connection, by controlling the size of the passages which contain the mixture of liquid being vaporized and vapor and which contain the condensing vapor and resulting condensate, the mass velocity of the fluid being heated can be maintained approximately equal to the mass velocity of the fluid giving up heat. The mass velocity is taken as the pounds of fluid per second per square foot of cross-sectional area of flow in the passages. Under optimum conditions the mass velocity of the fluid being heated is approximately equal to the mass velocity of the fluid giving up heat and it is preferable that the mass velocity of the fluid being heated be about one-half to twice the mass velocity of the fluid giving up heat. However, the advantages of this invention can be attained in high degree while maintaining the mass velocity of the fluid being heated about one-third to about three times mass velocity of the fluid giving up heat.

In connection with the foregoing example, it may be noted that the liquid is introduced into the heat exchanger at a very low velocity. In such systems, this invention is of particular advantage, since the rate of heat transfer is greatly increased by accelerating the movement of the liquid as a result of causing it to become commingled with vapor generated in narrow tortuous passages. When the liquid is introduced into an exchanger at a velocity less than about 5 ft./sec., the utilization of this invention is particularly advantageous. Moreover, this invention is of especial utility in systems wherein the liquid being evaporated is merely concentrated so that a substantial amount of unevaporated liquid is withdrawn from the system, e. g., as in the withdrawal of the concentrated brine solution mentioned in the example above given. It may also be noted that the liquid is introduced into the system under a definite pressure head and that there is a pressure drop between the inlet and the outlet of the conduit in which the vapor is condensed. The vapor is given a pressure increment between the evaporation step and the condensation step. This invention is especially advantageous when used in a system wherein the fluid undergoing change of phase is introduced continuously into the conduit in which the change takes place.

While this invention has been described in connection with distillation method and apparatus of the character illustrated and described in my application Serial No. 114,889 (Patent No. 2,185,595 issued January 2, 1940) and is of especial advantage in such method and apparatus, it may also be employed in connection with other distillation methods and apparatus. An example, of another application of this invention, is illustrated in connection with apparatus shown in Fig. 9 which may be used in the distillation of water, for example.

A heat exchanger which is indicated generally by the reference character 24 is contained in a shell 25. This heat exchanger may be according to any of the types which have been illustrated in connection with Figs. 1 to 8 or the equivalent thereof. Raw water is introduced through line 26 and is passed through one group of alternate passages in the exchanger 24 and is largely evaporated in these passages. The vapor passes off through line 27 to vapor separator 28 and to condenser 29 from which distilled water is discharged by line 40. The residual water containing concentrated impurities is discharged from shell 25 into line 41.

To evaporate the water, steam is introduced through line 42 which passes through the other group of alternate passages in the heat exchanger 24 in out-of-contact heat exchange with the water being distilled. The condensed steam is discharged by line 43.

In this embodiment, the heat exchanger may be constructed and operated in such manner as to maintain an intimate mixture of evaporating water and its vapor with resulting increase in efficiency hereinabove referred to. The practice of this invention utilizing apparatus of the character shown in Fig. 9 may be illustrated in connection with many of the common problems of distillation, evaporation, etc., such as evaporation of salt brines, sweet water in sugar refineries, etc. In such cases, the brine or other solution to be evaporated enters at the bottom through pipe 26, passes up through the passages outside the coils of exchanger 24, which may be similar to Figs. 4, 6 or 8, and is discharged through pipe 41. Steam, which may be exhaust steam from an engine, at 15 or 20 lbs. gauge pressure, enters the inside of the coils near the top from pipe 42, and the condensate from this steam is discharged through pipe 43 at the bottom of the exchanger. The steam liberated from the boiling brine is condensed in the conventional condenser, 29, by means of cold water and the condensate is drawn off through pipe 40. The countercurrent flow of steam and boiling liquid will be noted. The action within the tubes during evaporation or condensation and preferably both is similar to that described in the previous illustration and need not be discussed further here.

Instead of water, any other liquid may be distilled with steam or other condensating vapor in the type of apparatus shown in Fig. 9.

In the examples of this invention hereinabove described, the liquid being evaporated has been passed in counterflow heat exchange with condensing liquid. In many operations, this is preferable. For example, during the distillation of a liquid containing dissolved material, its boiling point increases as the liquid becomes more concentrated. By utilizing a counterflow heat exchange in the practice of this invention, the portion of liquid being evaporated which has the highest boiling point may be contacted with the condensing liquid when the condensing liquid is at its maximum temperature. When the condensing liquid is from vapor, for example, which has been superheated to some extent as by use of a compressor of the character shown in Fig. 1, the temperature drop can be controlled by the arrangement of the passages in the exchanger so that the superheated vapor will be in contact with that part of the heat exchanger wherein the evaporating liquid is most concentrated.

In certain embodiments of this invention, counterflow heat exchange is not utilized and control of the temperature gradient in different parts of the heat exchanger is achieved in other ways. This is of importance in the distillation of heat-sensitive liquids, for example. An illustration of method and apparatus of this character will be described in connection with Fig. 10.

In the apparatus shown in Fig. 10, a heat exchanger of any of the types shown in Figs. 1 to 8 may be used, the heat exchanger which is indicated generally by the reference character 44 being contained in shell 45. A heat-sensitive liquid such as milk, a gelatin solution, or the like, is introduced into the exchanger through line 46 and passes through one group of alternate passages in the exchanger 44. The vapor passes from shell 45 through line 46 into vapor separator 47 from which the vapor is removed by line 48 and from which the concentrate is removed by line 49. The vapor passes to condenser 50 which may be maintained at any desired pressure (e. g., subatmospheric) by pump 51.

Steam is introduced through line 52 and passes through the other group of passages in heat exchanger 44 in heat exchange relation with the evaporating liquid. It is thus seen that the steam is introduced through the passages of the exchanger 44 at the same end that the liquid to be evaporated is introduced, thereby rapidly heating the liquid to be evaporated as it enters the exchanger. At the same time, a high pressure drop is maintained in the passages in which the steam is condensed due to their small size so that the condensing temperature of the steam decreases rapidly. As the liquid being evaporated approaches the exit of the exchanger 44, it is subjected to a much lower temperature due to the pressure drop of the condensing steam in passing through the exchanger, but at the same time, the liquid being evaporated is maintained at high velocity due to its being commingled with the vapor in the small passages of the condenser. In this way, all parts of the heat exchanger are maintained at high efficiency with respect to the rate of heat transfer and the deposition of solids in the tubes is minimized. The condensed steam is withdrawn through line 53. If desired, the pressure drop of the condensing steam may be augmented by utilization of a vacuum pump 54 to draw off the condensed steam.

A specific example of this manner of utilizing the present invention follows:

Fresh milk, which is a heat sensitive liquid, and likewise one that tends to deposit solids on evaporation, is introduced into inlet 46 of the apparatus illustrated in Fig. 10, at a temperature of 40° F. and enters the exchanger 44, which may preferably be of the form illustrated in Fig. 4, the milk passing over the outside of the tubes between the layers of coils 34, 35, and 36 of Fig. 4. Steam at atmospheric pressure or below, enters the coils of the exchanger through pipe 52, and coming in thermal contact with the cold milk on the outside of the tube walls, condenses and heats the milk rapidly to about 160° F. at which temperature it boils under the vacuum of 21 inches of Hg maintained in the system by pump 51. Likewise the pressure of the steam supplied through pipe 52 decreases rapidly, owing to condensation and the frictional resistance of the long length of small tubes of which exchanger 44 is composed, so that at the point where the milk starts to boil the steam pressure is only 6.7 lb./in² absolute, corresponding to a condensing temperature of 175° F. At this point the utility of the present invention becomes apparent. In the old style of milk evaporator, the condensed steam flows in a film along the walls of the large diameter tubes and a considerable temperature drop from steam to tube walls is required, so that the steam pressure must be raised to approximately atmospheric pressure in order to get an effective wall temperature of say 170° F. If now, at some point the liquid film is broken, the wall temperature may rise to over 200° F. and the milk in contact with it will be scalded and will burn onto the wall, especially as it is flowing in a rather slow moving film over the tubes. According to my present invention, on the other hand, the condensed steam is kept in intimate mixture with the uncondensed steam, which is thereby permitted to have intimate thermal contact with the entire wall surface. Likewise as soon as vapor begins to form in the milk its velocity over the heating surfaces increases, and as it becomes more concentrated, viscous and liable to burn on, the velocity becomes so great that the heating surfaces are swept clean at all times. The heat transfer is so rapid and the amount of milk in the exchanger at any instant is so small that removal of half of the original water in the milk may be accomplished in a matter of a few seconds, if desired, and the flavor and quality of the product greatly improved.

While this invention has been described in connection with certain illustrative embodiments thereof, it is to be understood that this has been done for the sake of giving an understanding of this invention by reference to exemplifications thereof and that the scope of this invention is to be governed by the language of the following claims.

I claim:

1. A method which comprises moving a fluid to undergo change of phase through a conduit, effecting said change of phase by heat exchange through the walls of said conduit and intermediate the ends of said conduit, the length of said conduit being at least 1200 times its average hydraulic radius and its average hydraulic radius being at most about ⅜ inch to about ¾ inch proportionally for liquids having a surface tension of 70 dynes per centimeter to 20 dynes per centimeter, and said fluid under the conditions of confinement provided by said conduit occurring in the form of portions in liquid phase with portions in vapor phase therebetween, the volume of fluid in vapor phase changing as the vapor and liquid are moved through said conduit and the rate of movement of said portions of fluid in liquid phase changing responsive to said change of volume of the vapor as the vapor and liquid are moved through said conduit.

2. In a method of distillation wherein a liquid is vaporized by out-of-contact heat exchange with a vapor condensing at a temperature above the boiling point of said liquid and vapor evolved from said liquid is separated from the residual liquid, the steps comprising moving said vapor while it is undergoing condensation in out-of-contact heat exchange with said liquid in an elongated conduit which is at least 1500 times the average hydraulic radius thereof, said average hydraulic radius being at most about ¼ inch to about ½ inch for a condensate formed by condensation of said vapor having proportionally a surface tension of about 70 dynes per centimeter to 20 dynes per centimeter, and the condensate formed in said conduit under the conditions of confinement provided by said conduit becoming commingled with the vapor undergoing condensation with portions of the condensate separated by portions of vapor and the condensate decelerating as it moves through said conduit responsive to decrease in volume of the condensing vapor in said conduit until the condensate is moving at a rate that is many times less than the rate of movement of the condensate when it is initially formed in said conduit.

3. A method according to claim 2 wherein the temperature differential between the condensing vapor and the liquid undergoing vaporization is less than 100° F. and said liquid undergoing vaporization is moved through a conduit in counterflow heat exchange with the condensing vapor.

4. Apparatus for effecting change of phase of a liquid which comprises a heat exchanger including a plurality of substantially imperforate barriers nested one within another and between said barriers a plurality of elongated passages the length of which is greater than about 1200 times the hydraulic radius thereof and the hydraulic radius of which is not greater than ⅜ inch, means for moving a first fluid through at least one of said passages, and means for moving another fluid through another of said passages to undergo change of phase therein by out-of-contact heat exchange with said first fluid through the walls of said passages.

5. Apparatus for effecting change of phase of a liquid which comprises a heat exchanger including a plurality of spaced sheet-like shells nested one within another and dividing means arranged to divide the space between said shells into a plurality of tortuous passages the length of which is greater than about 1200 times the hydraulic radius thereof and the hydraulic radius of which is not greater than ½ inch, means for moving a first fluid through at least one of said passages, and means for moving another fluid through another of said passages to undergo change of phase therein by out-of-contact heat exchange with said first fluid through the walls of said passages.

6. A method of evaporating a liquid which comprises moving a liquid to be vaporized through a conduit with a pressure drop between the inlet and the outlet, effecting vaporization of said liquid by heat transmitted to the liquid within the conduit through the walls of said conduit and intermediate the ends of said conduit, and withdrawing vapor and residual liquid from the outlet end of said conduit and separating the vapor from said residual liquid, the length of said conduit being at least 1200 times its average hydraulic radius and its average hydraulic radius being at most about ¼ inch to about ½ inch for liquid having proportionally a surface tension of 70 dynes per centimeter to 20 dynes per centimeter, and the vapor that is formed as a result of evaporating said liquid under the conditions of confinement provided by said conduit occurring in the form of bodies of vapor entrapped between portions of residual liquid bridging the cross-section of said conduit, the volume of the vapor increasing as the liquid undergoing vaporization is moved through said conduit and the rate of movement of said portions of residual liquid being accelerated until the rate of travel of residual liquid in said conduit is at least 10 times the rate of travel of said liquid at said inlet.

7. A method of evaporating a liquid according to claim 6 wherein the liquid, when peripherally confined in said conduit as recited in claim 6, is heated through the walls of said conduit by heat exchange with a fluid medium at a temperature not more than 100° F. above the boiling point of the liquid within said conduit and wherein at least 50% of the liquid introduced into said conduit is vaporized in a single pass through said conduit.

8. In a method of distillation wherein a liquid to be distilled is continuously introduced into one end of a first conduit and is moved through said first conduit with a pressure drop between the inlet and outlet in out-of-contact heat exchange relation with a vapor which is condensing in a second conduit and the condensing temperature of which is above the boiling point of the liquid in said first conduit, vapor is evolved from liquid in said first conduit intermediate the ends thereof by heat supplied by said condensing vapor condensing in said second conduit, concentrated liquid commingled with vapor evolved from said liquid in said first conduit is discharged from the outlet of said first conduit and is separated from said concentrated liquid, and condensate resulting from condensation of said condensing vapor is discharged from said second conduit, the steps comprising accelerating the rate of travel of said liquid in said first conduit in said region of said out-of-contact heat exchange by peripherally confining said liquid in said first conduit together with vapor evolved from said liquid in said first conduit in the form of portions of liquid bridging the cross-section of said first conduit with bodies of evolved vapor entrapped between said portions of liquid, continuing to evolve vapor from said liquid while said liquid and vapor are thus peripherally confined with said evolved vapor entrapped between said portions of liquid bridging said first conduit and while continuing to introduce liquid to be distilled into said first conduit, moving said portions of liquid by pressure thereagainst of said entrapped bodies of vapor at an increasing rate of travel as the amount of said entrapped vapor increases until the rate of travel of said portions of liquid in said first conduit is at least 10 times the rate of travel of said liquid as it is continuously introduced into said first conduit, and concurrently with said acceleration of said liquid in said first conduit decelerating in said region of out-of-contact heat exchange the rate of travel of the condensate resulting from condensation of said condensing vapor in said second conduit by peripherally confining said condensing vapor and condensate within said second conduit in the form of portions of condensate bridging the cross-section of said second conduit with bodies of uncondensed vapor entrapped therebetween, continuing to introduce vapor to be condensed into said second conduit and continuing to condense the uncondensed vapor constituting said entrapped bodies of vapor with decrease in the volume thereof and with decrease in the rate of travel of said portions of condensate responsive to decrease in the volume of residual uncondensed vapor until the rate of travel of said condensate is less than $\frac{1}{10}$ the highest rate of travel of said condensate in said second conduit.

9. A method of distillation according to claim 8 wherein vapor discharged from said first conduit is compressed until its condensing temperature is above the boiling point of the liquid in said first conduit and, after compression, is directed into said second conduit to provide the condensing vapor in said second conduit, the condensing vapor in said second conduit being directed in out-of-contact counterflow heat exchange with the liquid undergoing vaporization in said first conduit.

10. A method of distillation according to claim 8 wherein the mass velocity of the liquid and vapor in said first conduit is not less than about one-third and is not more than about three times the mass velocity of the vapor and condensate in said second conduit and wherein the maximum temperature differential between the liquid and vapor in said first conduit and the vapor and condensate in said second conduit is less than 100° F.

11. Distillation apparatus for distilling aqueous solutions in a single pass followed by separation of the liberated water vapor from the residual concentrated solution, which apparatus comprises a heat exchanger including an elongated passage, means for continuously introducing a solution to be distilled into said passage in predetermined amount, means for vaporizing a portion of the solution contained in said passage at a point intermediate the ends of said passage by out-of-contact heat exchange with another fluid, said passage having an average hydraulic radius not greater than one-quarter inch and having a length that is at least 1200 times its average hydraulic radius, whereby said passage is adapted to cause vapor generated in said solution within said passage to become entrapped between residual portions of solution that bridge said passage so that said portions of solution move at accelerated rate upon the generation of vapor within said passage, means for separating concentrated solution discharged out of said passage from vapor commingled therewith, means for withdrawing from the system said concentrated solution discharged from said passage as separated from said vapor, and means for condensing the vapor separated from said concentrated solution to form a distillate.

ROBERT V. KLEINSCHMIDT.